(12) United States Patent
Gustavsson

(10) Patent No.: US 8,315,634 B2
(45) Date of Patent: Nov. 20, 2012

(54) ROUTING BASED ON TRANSMISSION UTILIZATION

(75) Inventor: Pär Gustavsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 724 days.

(21) Appl. No.: 11/662,894

(22) PCT Filed: Sep. 16, 2004

(86) PCT No.: PCT/SE2004/001340
§ 371 (c)(1),
(2), (4) Date: Aug. 6, 2008

(87) PCT Pub. No.: WO2006/031157
PCT Pub. Date: Mar. 23, 2006

(65) Prior Publication Data
US 2009/0082023 A1     Mar. 26, 2009

(51) Int. Cl.
*H04W 40/00*       (2009.01)
(52) U.S. Cl. .................. 455/445; 455/435.1; 455/432.1; 455/422.1; 370/229; 370/230; 370/236
(58) Field of Classification Search .................. 455/445, 455/422.1, 432.2, 435.1, 435.2, 432.1, 432.3, 455/435.3, 435; 370/352–357, 360, 229, 370/230, 230.1, 231, 235, 236, 248, 328–329, 370/338
See application file for complete search history.

(56) References Cited

U.S. PATENT DOCUMENTS 6,091,953 A * 7/2000 Ho et al. ........................ 455/433

(Continued)

FOREIGN PATENT DOCUMENTS

WO        03/103325        12/2003

(Continued)

OTHER PUBLICATIONS

3GPP Tech. Spec ETSI TS 123 236, V5.3.0, Digital Cellular Telecommunications System (Phase 2+); Universal Mobile Telecommunications System (UMTS); Intra-domain connection of Radio Access Network (RAN) Nodes to Multiple Core Network (CN) Nodes (3GPP TS 23.236 version 5.3.0 Release 5), Dec. 2004.

(Continued)

*Primary Examiner* — Jinsong Hu
*Assistant Examiner* — Magdi Elhag
(74) *Attorney, Agent, or Firm* — Nixon & Vanderhye P.C.

(57) ABSTRACT

A method of alternative routing of a service request in connection with a pool 1 of integrated core network nodes. Before a serving radio access node routes a service request to the core network node serving a mobile station it checks if there are any idle terrestrial transmission resources available between the serving radio access node and the serving core network node. If idle resources are available, the service request is routed to the serving core network node. If no idle resources are available, the service request is rerouted to a selected one of the other core network nodes the pool that has idle resources available. The selected core network node receives the service request, recognizes it contains no temporary identification (TMSI) number associated with it and therefore sends an identity request to the mobile station. The identity request triggers the mobile station initiate an update location registration at the selected core network node or at any of the other core network nodes in the pool. The selected core network node or said other network node now acts as serving core network node for the mobile station. Next time the mobile station makes a service request the radio access node routes it to said selected or said other network node to which it hopefully are idle terrestrial transmission resources available.

21 Claims, 6 Drawing Sheets

U.S. PATENT DOCUMENTS

| | | |
|---|---|---|
| 6,731,937 B1 | 5/2004 | Spinner |
| 7,054,629 B2 * | 5/2006 | Turina et al. ............... 455/432.1 |
| 7,660,586 B2 * | 2/2010 | Lundin et al. ................. 455/445 |
| 2003/0016644 A1 * | 1/2003 | Kuster et al. .................. 370/337 |
| 2003/0028644 A1 * | 2/2003 | Maguire et al. ............... 709/226 |
| 2003/0137952 A1 | 7/2003 | Menon |
| 2004/0203736 A1 | 10/2004 | Serna |
| 2004/0248592 A1 * | 12/2004 | Turina et al. .................. 455/461 |
| 2005/0192005 A1 * | 9/2005 | Blom et al. ................. 455/432.1 |
| 2005/0281216 A1 * | 12/2005 | Varonen et al. ............... 370/328 |
| 2007/0238461 A1 * | 10/2007 | Lundin ........................ 455/436 |

FOREIGN PATENT DOCUMENTS

WO     03/103325 A1     12/2003

OTHER PUBLICATIONS

International Search Report (corrected) for PCT/SE2004/001340 mailed Jun. 1, 2005.

* cited by examiner

ROUTING BASED ON TRANSMISSION UTILIZATION

This application is the US national phase of international application PCT/SE2004/001340 filed 16 Sep. 2004, which designated the U.S., the entire content of which is hereby incorporated by reference.

TECHNICAL FIELD OF THE INVENTION

Generally the present invention relates to a method of routing between a pool of integrated network nodes and radio access network nodes in telecommunications systems such as GSM and UMTS. In particular the routing is based on the utilization of transmission facilities between the pool of integrated network nodes and the radio access network nodes.

GENERAL BACKGROUND OF THE INVENTION

An MSC pool is defined as a pool of MSC/VLR nodes linked to a number of RAN nodes. In the GSM standard RAN nodes are called BSC nodes and in the WCDMA standard RAN nodes are called RNC nodes. The invention is applicable to telecommunications systems such as GSM and WCDMA systems although the below description refers to GSM system only. Each BSC is connected to each of the MSC/VLR in the MSC/VLR pool.

In [1] the approach of having a pool of integrated core network nodes MSC/VLR has been selected and specified. The concept of a pooled core network has been proposed as a way to ease the scalability of the core network and to improve the service availability in the core network by limiting the effect of an outage of an MSC/VLR node.

When more capacity is needed, additional MSC/VLR nodes can be added to the pool without increase of the location update and inter-MSC handover traffic. An MS will be registered in the same MSC/VLR node as long as the mobile is located within the radio network related to the MSC/VLR pool.

Between the BSC and MSC/VLR nodes terrestrial transmission resources are needed in order to transport the traffic channels. A traffic channel can for example be used for a speech call or a circuit switched data call.

The radio network controlled by a BSC node will generate a specific amount of traffic in terms of speech calls etc. and in order to match this traffic a number of terrestrial transmission resources need to be configured between the BSC and the MSC nodes. The number of terrestrial transmission resources that are needed depends on a number of factors like the requirement on the blocking probability at call set-up (during busy hour), the estimated busy hour traffic etc.

A BSC node connected to a pooled core network will need a number of terrestrial transmission resources for each MSC in the MSC pool. Since it is the MSC node that controls the allocation of the terrestrial transmission resources there will be a terrestrial transmission resource pool for each BSC-MSC connection.

Remember that each BSC node is connected to each of the MSC/VLR nodes in the MSC/VLR pool. Also remember that when an MS registers its presence in the system, it will register its presence in one of the MSC/VLR nodes in the core network. If it is the first time the MS performs a registration in the particular MSC pool, an MSC/VLR node will be selected among the MSC/VLR nodes in the pool; in all other cases the registration will be performed towards the MSC/VLR in which the MS is currently registered.

Since it is the MSC node that allocates the terrestrial transmission resources during a call set-up it might be the case that the call set-up fails due to shortage of terrestrial resources between the BSC and a specific MSC. Then the terrestrial resource shortage is detected, the MSC node will terminate the call set-up and request the BSC node to release radio resources allocated during the early phase of the call set-up.

As the traffic load in the system increases the transmission facilities between the MSC pool and the BSC nodes will be more and more loaded and finally a point is reached when there are no or only a few transmission facilities available for calls. If under these circumstances an MS makes a call, the call will be rejected. This case is of course serious per se, but not that serious, since the possibility is low to find any non-occupied transmission at other locations in the down loaded system assuming a load balanced MSC pool.

Suppose the transmission facilities between an individual BSC node and the MSC pool have a major failure and go down. Also suppose the traffic load is low. If under these circumstances an MS makes a call, the call will be rejected since there are no transmission facilities available between the BSC node and the MSC that allocates the transmission resources. This case, below referred to as "local shortage problem", is serious, since there are transmission facilities available at other locations in the system. Such non-occupied transmission facilities will exist between the BSC node and other pooled MSCs than the one at which the MS is currently registered.

Given a predefined traffic load it can be shown that if MSC nodes are pooled in the manner described above, the amount of transmission facilities required to cope with said traffic load will increase compared to the case when the MSC nodes are not pooled. Pooling per se will thus increase the need of transmission facilities.

SUMMARY OF THE INVENTION

This invention addresses, at least in part, both the problem with the mobile originating call failure due to a "local" shortage of terrestrial resources and also the increased need for terrestrial resources due to the introduction of the MSC in pool concept.

In a wide sense the "local" shortage problem is solved in accordance with an aspect of the invention if the BSC node performs a check of the terrestrial resource situation before sending the call setup service request to the MSC. This is possible since occupied terrestrial resources between the BSC and a specific MSC node are known to the BSC. If all or close to all terrestrial resources are occupied between the BSC and a MSC, the BSC routes the call setup service request to another MSC node in the MSC pool to which there are free terrestrial transmission resources that can be used for the requested service.

By performing said inventive check of the available terrestrial resources already in the BSC node, the BSC node can treat the terrestrial resources from the BSC node towards the MSC nodes in the pool as one big pool of terrestrial resources. This implies that a part of the increased need for terrestrial resources is not necessary. More precisely it is possible to decrease the terrestrial resources needed for the mobile originated calls. The terrestrial resources needed for the terminated calls are not affected by this invention.

The invention also relates to a BSC node as well as to a telecommunications system with BSC nodes provided with an MSC allocation algorithm that co-operates with a BSC resource handler in order to select an MSC in the pool to which there are free terrestrial transmission resources.

A feature of the invention relates to the case when there are no or only a few resources free to the serving MSC. The service request will in this case comprise a TMSI value. At the first call attempt, initiated by the user of the MS, the BSC selects another MSC, below called the second MSC, in the pool than the one at which the MS is registered and forwards the service request to the second MSC. The second MSC does not recognize the MS, since the MS is not registered at it, and starts a new procedure requesting the MS to identify itself. The MS sends its IMSI value to the second MSC. The second MSC checks its lists and cannot find it serves the MS with the indicated IMSI value and rejects the call. Reception of a call rejection triggers the MS to automatically start and run a location update procedure with the second MSC with the result that the second MSC registers the presence of the MS, which is identified by its IMSI value, in its associated VLR. Further, the second MSC allocates a TMSI value to the MS. The allocated TMSI value is transmitted to the MS and the second MSC associates the allocated TMSI value with the IMSI value of the MS and stores this relation in its tables. The next time the MS makes a call attempt it will be served by the second MSC which hopefully will have free terrestrial transmission resources for the call.

In a further embodiment of the invention the BSC, upon reception of a location update message which contains the IMSI value of an MS, checks available terrestrial transmission resources among the MSC nodes in the MSC pool and selects one which has enough such resources free. The BSC then routes the location update to the selected MSC at which the MS now registers its presence and receives a TMSI value. If the time interval between the location update and the next call setup attempt is not too long, hopefully some of these free resources are still free at the selected MSC so that the call-set up is successful. If said time interval between is reasonably short chances are good that the call-set up is successful.

In the following the prior art as well as the invention will be described with reference to a circuit switched domain of an evolved GSM telecommunication system.

DETAILED DESCRIPTION OF PRIOR ART

Figure 1:
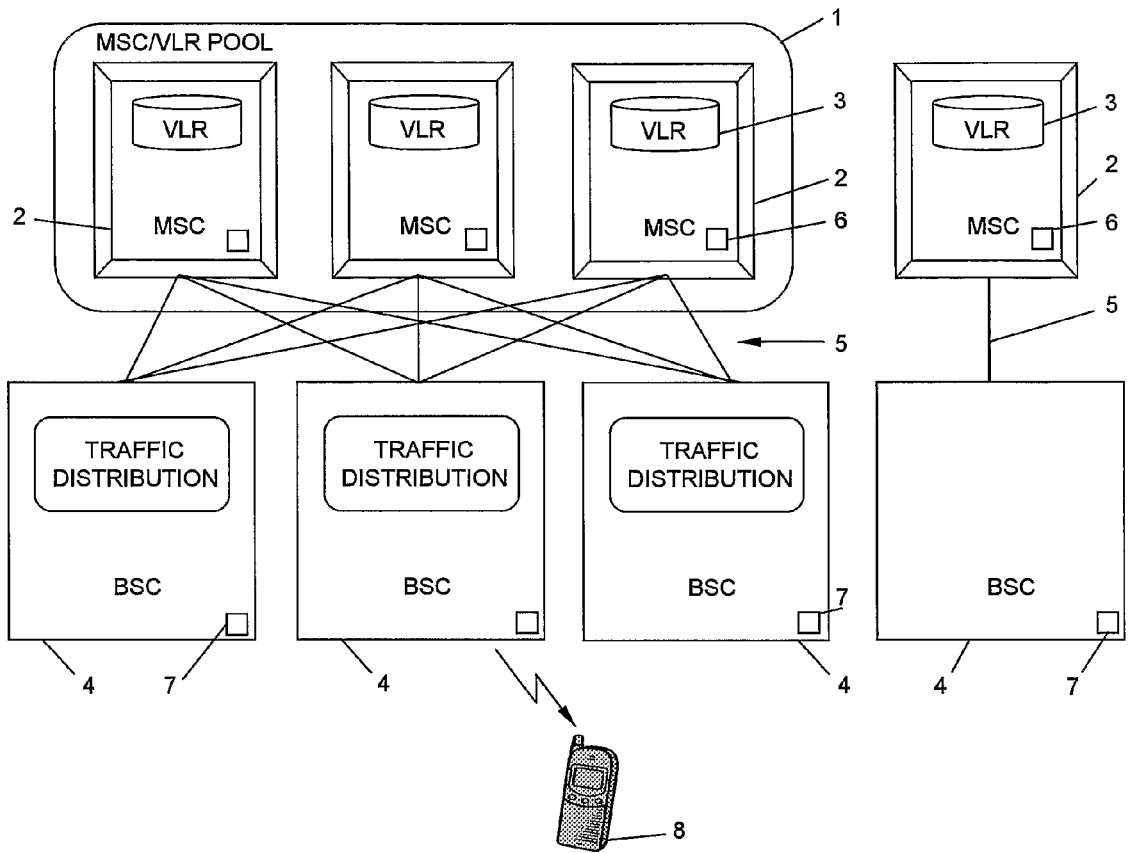
FIG. 1 is a block diagram illustrating the MSC pool concept.

FIG. 1 discloses a pool 1 of pairs of integrated MSC nodes 2 and VLR nodes 3. Each integrated node MSC/VLR is connected to a plurality of BSC nodes 4 over terrestrial transmission resources which typically comprise signaling links and links for transmission of traffic channels. Of the terrestrial transmission resources only the transmission links are the subject of the present invention and these will be denoted with reference designation 5.

Each MSC comprises a resource handler 6 handling the terrestrial transmission resources to each respective BSC. Each BSC also comprises a respective resource handler 7 handling the terrestrial transmission resources to each respective integrated MSC/VLR node.

The MSC/VLR is part of the core network whilst the BSC is part of the radio network. The term mobile station (MS) is used to denominate the mobile equipment in a GSM system (the corresponding term is UE in a WCDMA system). In FIG. 1 an MS is denoted with reference designation 8.

An MS registers its presence in the GSM system at many different occasions, for example when it is switched on thus becoming active, or when an active MS moves from an area with no radio coverage into an area with radio coverage, by performing a location update procedure towards the MSC in which the MS is registered. In case the MS is not previously registered, an MSC/VLR node is first selected out of the MSC/VLR nodes in the MSC pool. The signaling between the MS and the MSC/VLR is performed via a BSC node called the serving BSC. As shown any BSC can connect to any MSC in the pool.

The pool of integrated MSC/VLR nodes serves a non shown pool area within which the MS may roam and still be registered in the same MSC/VLR.

The right part of FIG. 1 discloses the case of a non-pooled MSC connected to a dedicated BSC.

Figure 2:
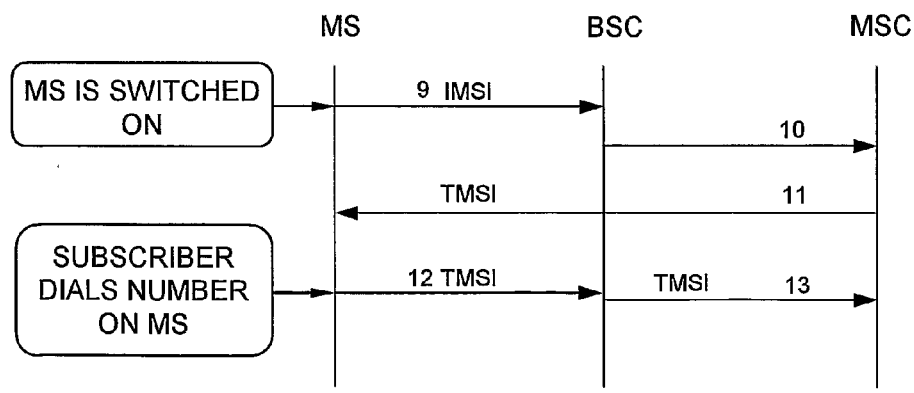
FIG. 2 is a signaling diagram illustrating signaling between an MS and MSC upon registration of the MS in an MSC/VLR node in the core network.

The registration procedure is schematically illustrated in FIG. 2. Only those part of the registration procedure that is important to understand the invention will be described.

When the MS is switched on it establishes radio contact with a nearby non-shown radio base station RBS to which it sends a registration message 9. The registration message contains the IMSI value of the MS. The non-shown RBS signals the registration message to the BSC serving the RBS. The BSC in its turn processes the message and forwards the registration message 10 to an MSC in the pool. The MSC receiving this message is the one which serves the specific MS. More on this will be described further down.

Each MSC in the pool 1 has a non-shown pool of local TMSI numbers. The TMSI numbers are specific for each individual MSC.

A TMSI number is a temporary identifier with a length of 4 octets, which is assigned to the MS when it registers in a MSC/VLR. The TMSI is used to increase the subscriber confidentiality, by avoiding sending IMSI numbers on the air interface. Once a TMSI has been assigned to the MS, the MS uses the TMSI to identify itself in the network. The usage of TMSI is mandatory within a pool of integrated MSC/VLR nodes.

The TMSI concept as such is not changed by the introduction of an MSC/VLR pool, but the TMSI structure is changed to include more information; the Network Resource Identifier (NRI). The NRI field consists of 0 to 10 bits coded within the TMSI and is needed to define a unique MSC/VLR within an MSC pool. At least one NRI value has to be assigned to an MSC/VLR in an MSC pool. The TMSI numbers that are assigned by a specific MSC/VLR node will include a NRI field related to said assigning MSC/VLR node.

A routing functionality in the BSC uses the NRI field in the TMSI structure for routing messages originated by an MS to the MSC in which the MS is registered, the so called serving MSC.

In response to receipt of the registration message 10 the MSC registers the IMSI of the MS in its registration tables and allocates a TMSI number to the MS, noting the relationship between the received IMSI number and the allocated TMSI number.

Thereafter the MSC sends a registration acknowledgment message 11 comprising the TMSI number to the MS. This completes the registration procedure. An IMSI number is globally unique, while a TMSI number is locally unique.

It shall be noted that the MS will repeat the registration procedure periodically and also when the MS roams into a new location area. If the MS has received a TMSI value earlier, previously performed a registration procedure, this TMSI value is used as identity instead of the IMSI value in sub sequent registration activities.

When the user of the MS wants to make a call he/she dials the number to the desired destination and presses an off-hook button on the MS. This trigger the MS to transmit a service request message 12 to the BSC, said message comprising the TMSI number allocated to the MS. A service request is often referred to as a call set up or call set up attempt. This message is received at the serving BSC which processes it and forwards the processed service request 13 containing the TMSI to the serving MSC. On receipt of the service request message the MSC compares the TMSI numbered therein with its registration tables to find out the MS that is making the call. It then retrieves the corresponding subscriber data from its VLR and takes appropriate actions for set-up of the call, among these the allocation of transmission resources, terrestrial as well as radio bound, for the call.

Figure 3:
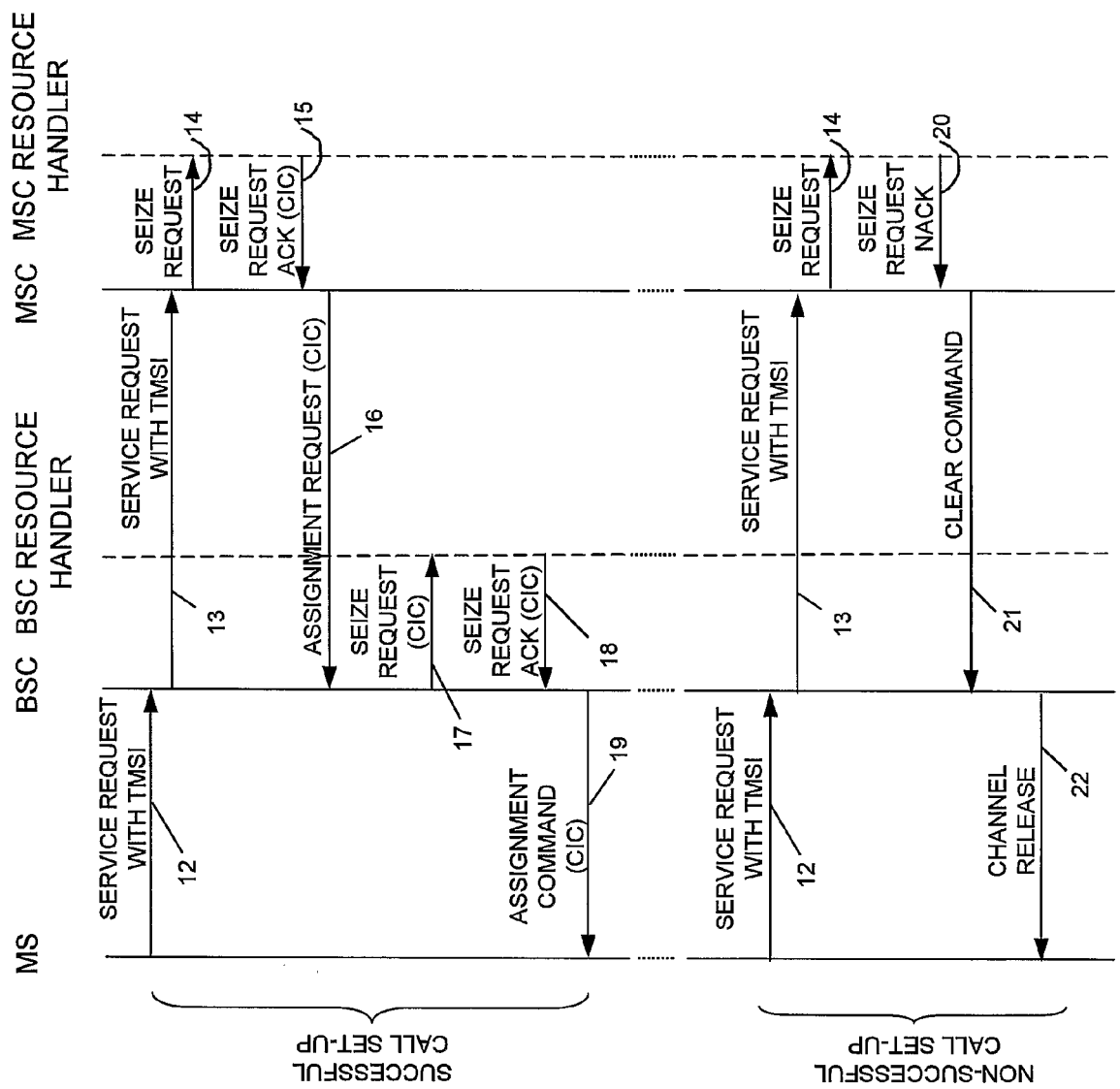
FIG. 3 is a signaling diagram illustrating call set-up of in accordance with prior art.

FIG. 3 discloses call set-up in case terrestrial transmission resources are available, as shown in the upper part of the Figure, and in case no terrestrial transmission resources are available, as shown in the bottom part of the Figure.

When the MSC receives the processed service request 13 with TMSI it checks with its terrestrial transmission resource handler if there are any free terrestrial transmission resources to the serving BSC by sending a seize request message 14 to the resource handler 6. If there are free resources the resource handler 6 will allocate the service request a free resource and return a seize request acknowledgment message 15 comprising a CIC value which identifies the link and time slot on which the call shall be transported. The MSC composes an assignment request message 16 for the BSC and includes therein the allocated CIC value.

On receipt of the assignment request message the BSC sends a seize request message 17 to its terrestrial transmission resource handler 7. The BSC terrestrial transmission resource handler 7, which has knowledge of the total number of terrestrial resources existing between the BSC and the MSCs in the MSC pool, keeps a running count of the seized terrestrial transmission resources. Accordingly there is a 1-to-1 relationship between the resources reserved by the MSC and the resources seized by the BSC. The BSC will therefore have knowledge on the terrestrial transmission resources that the MSC allocates and on the terrestrial transmission resources that are free.

On receipt of the seize request message 17 the resource handler 7 checks it tables to see if any free resources are available. In this case it is assumed there are free resources and the resource handler seizes the circuit indicated by the CIC value in the seize request. The resource handler returns a seize request acknowledgement message 18 comprising the CIC value to the BSC.

The BSC in its turn will compose an assignment command message 19. The assignment command message is sent to the MS and includes information that makes it possible for the MS to set up a dedicated radio channel to the BSC. Note that it is the BSC node that allocates the radio channel needed for the call. This completes a successful call set-up.

If the MSC resource handler 6 finds there are no free terrestrial transmission resources it will respond to the seize request message 14 by returning a seize request non-acknowledgement signal 20 to the MSC. The MSC composes a clear command message 21 which it sends to the BSC and the BSC sends a channel release message 22 to the MS. The MS aborts the set-up procedure. The set-up request is thus denied, that is non-successful.

The user must make a new call if he/she still has a need to communicate, that is he/she must enter the digits again. If he/she does so the connection request will be captured by the same BSC and the BSC will forward it to the same MSC as in the discussed example. If the terrestrial transmission resources between the BSC and the discussed MSC have a failure, for example a broken transmission link, or if the renewed service request is made shortly, say within some minutes, after receipt of channel release message no terrestrial resources are available, or most probably no resources have been cleared, and the renewed service request is rejected.

Up to now call set-up in accordance with prior art has been described.

DETAILED DESCRIPTION OF THE INVENTION

Figure 4:
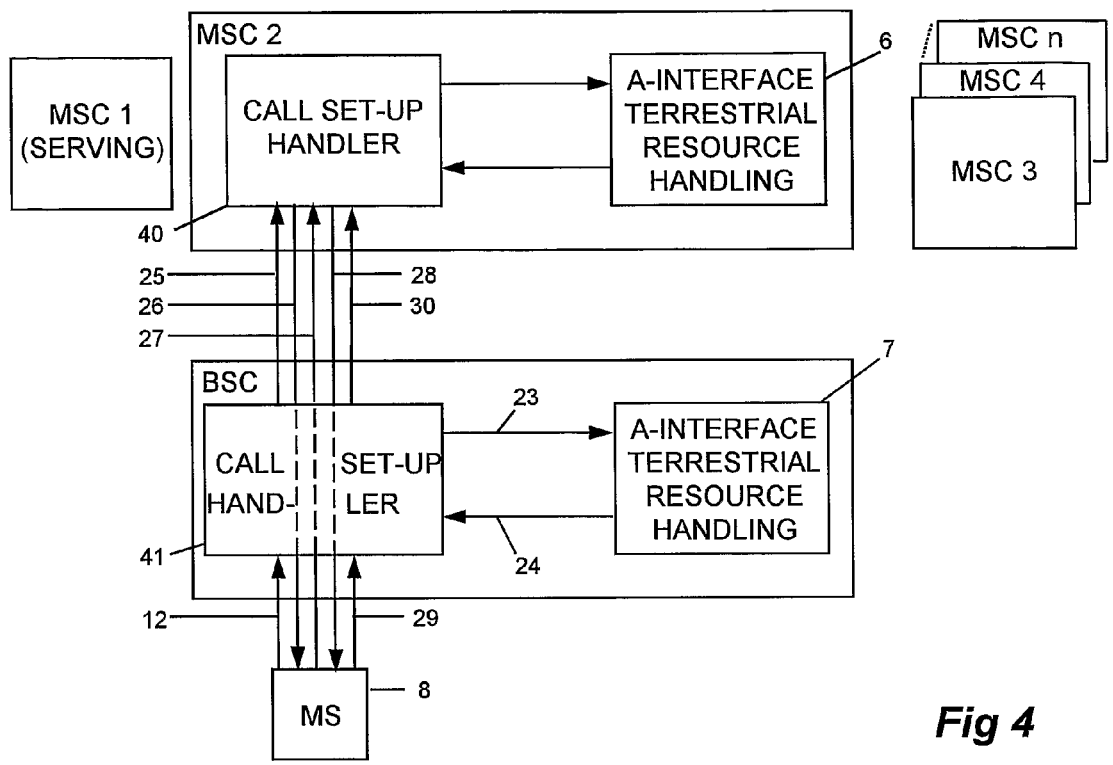
FIG. 4 is a combined block and signaling diagram illustrating a first part of a call setup in accordance with the invention in the case there are no terrestrial transmission resources available.
Figure 5:
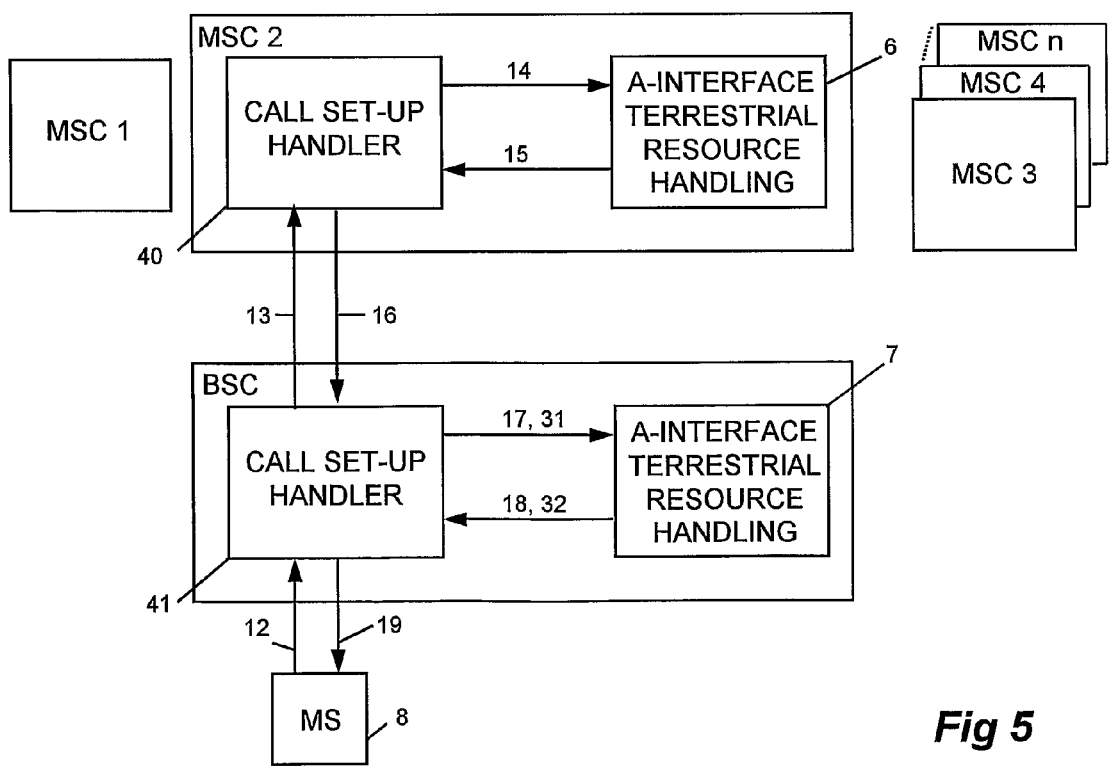
FIG. 5 is a combined block and signaling diagram illustrating a second part of the call set-up in the case there are no terrestrial resources available.
Figure 6:
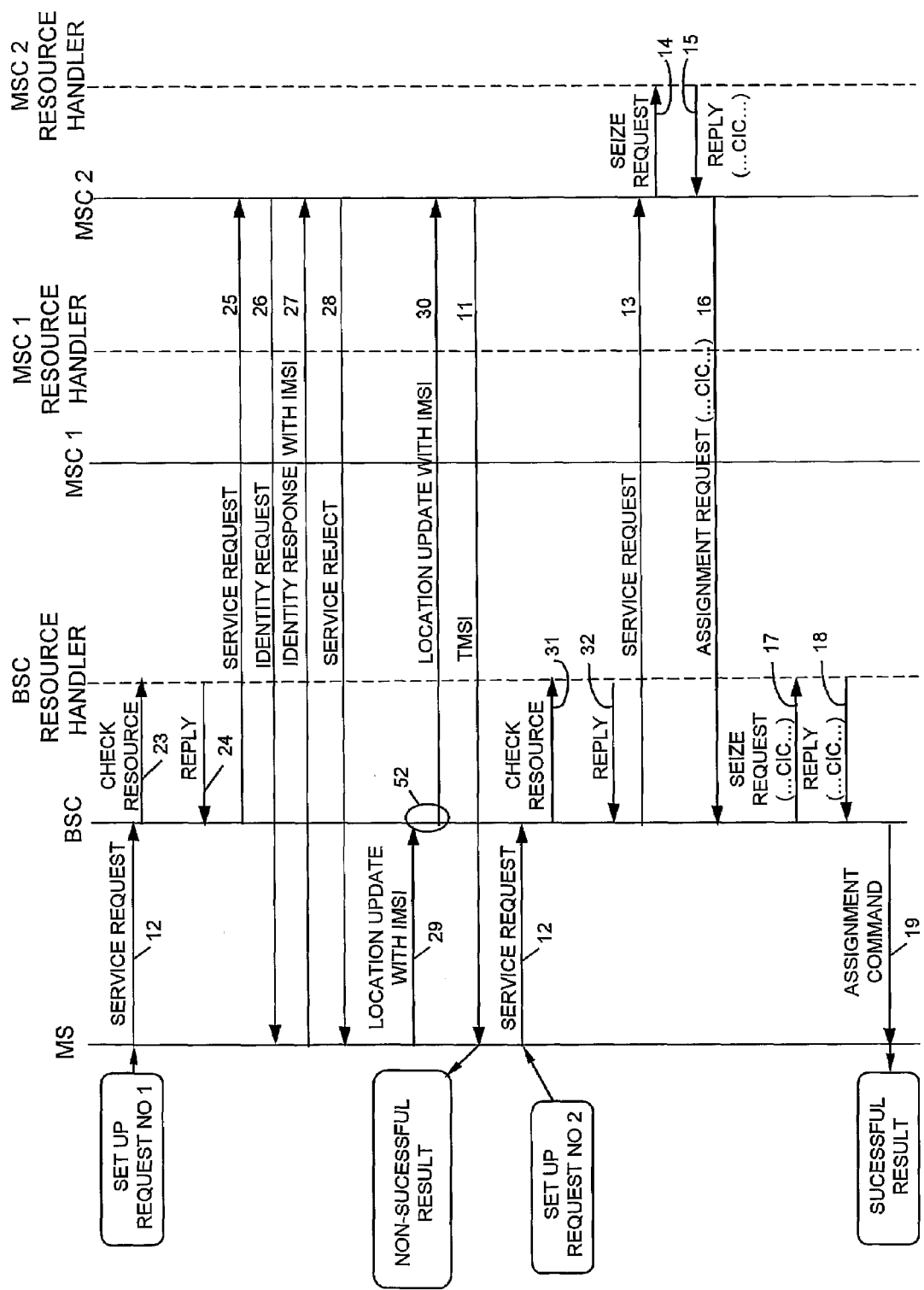
FIG. 6 is a signaling diagram illustrating the complete set-up of a call in the case there are no terrestrial transmission resources available.

Reference is now made to FIGS. 4-6 describing the invention. It is assumed the pool comprises a plurality of MSC/VLR nodes labeled MSC 1, MSC 2 . . . MSC n. Each MSC includes a logical entity 40 labeled call set-up handler and each BSC includes a logical entity 41 labeled call set-up handler. The call set-up handlers 40 and 41 communicate over signaling links 5 (see FIG. 1).

An aspect of the invention will be described in connection with MSC 2. It should be clear, however, that the procedures described below take place at any combination of an MSC/VLR node and BSC node.

In FIG. 4 it is assumed that there are no terrestrial transmission resources free to be used for transmission of traffic channels (i.e. speech call) between the serving BSC and the MSC serving the MS, in this case MSC 1. The MS sends the usual service request message 12 to the BSC serving it. The BSC extracts the TMSI number included in the service request message and learns the serving MSC (the MSC in which the MS is registered), in the example MSC 1. Instead of immediately forwarding the request to MSC 1 as was done in FIG. 3 at arrow 13, the BSC will start and run a check procedure with its resource handler 7 in order to find out if there are any terrestrial transmission resources available to the serving MSC 1. To this end the BSC sends a resource check message 23 to its resource handler. The resource check is thus done before the service request is routed to an MSC. The resource handler checks the resources to MSC 1 in its tables and responds to the resource check message with a resource check response message 24 that includes the number of idle terrestrial transmission resources for all of MSCs in the MSC pool including MSC 1. The BSC has a call set-up routing algorithm (shown in FIG. 9) so designed that in case the resource check response message is negative, in the sense that no or very few idle terrestrial transmission resources exist towards the indicated MSC (MSC 1 in this example), it routes the service request to another pooled MSC that has idle terrestrial transmission resources available according to the resource check response message. In this example it is assumed that the BSC routes a "complete layer 3 information signal" 25 to MSC 2, this signal 25 comprising the service request 12.

MSC 2 upon receipt of the rerouted service request 12, which contains the TMSI of the MS in MSC 1, checks its TMSI tables in order to establish the IMSI identity of the MS from which the request was transmitted. It finds no TMSI number that matches the received TMSI. MSC 2 therefore cannot approve the request. Instead it responds to the service request by sending an identity request message 26 to the BSC which forwards the message transparently to the MS. This procedure is in accordance with the layer 3 protocol of ref [2].

On receipt of the identity request message the MS is triggered to send an identity response 27 containing the IMSI of the MS. The MS does this automatically and its user needs not to take any actions for transmitting this message. The identity response is sent to MSC 2. The MSC 2 detects that the IMSI is not registered in its VLR and this triggers the MSC 2 to send a service reject message 28 to the MS.

Receipt of a service reject message triggers the MS to start a location update procedure by sending a location update message 29 containing its IMSI to BSC. The BSC has a location update routing algorithm (shown in FIG. 8) is so designed that if a location update message containing IMSI is received, the algorithm will distribute the location update message 29 to anyone of the nodes in the MSC pool. In this example we assume the BSC has chosen to route the location update message 29 to MSC 2 as is indicated by arrow 30. The location update message is received by MSC 2 that registers the MS in its VLR and assigns it a TMSI value. MSC 2 responds back to the MS with the usual registration acknowledgement message 11, not shown in FIG. 4 for clarity reasons. This completes the non-successful service request. The result of the procedures described in connection FIG. 4 is that the first service request 12 initiated by the user is denied by MSC 1 because of lack of resources, that the service rejection triggers the MS to perform a location update, and that the result of the location update procedure is that the MS is registered in MSC 2 and is assigned a TMSI number.

Refer to FIG. 5. It is assumed the procedures of FIG. 4 have been performed and that MSC 2 has free terrestrial transmission resources. Suppose the user needs to come in contact with the user at the telephone number he/she entered in the first set-up request which was denied. The user dials the same digits a second time thereby initiating a second service request message 12 shown in FIG. 5. The BSC receives the message, extracts from it that this MS is registered at MSC 2, and performs the check in accordance with the invention by sending a resource check message 31 to its resource handler. The resource handler returns the number of idle terrestrial transmission resources. The resource check response message 32 is positive since idle resources exists towards MSC 2 and the routing algorithm in BSC sends the service request with TMSI to MSC 2. The TMSI number is recognized by MSC 2 and MSC 2 sends a seize request 14 to its resource handler which responds with a seize request acknowledgment message 15 containing a CIC value identifying the allocated terrestrial transmission resource. Thereafter the signaling is similar to the one shown in the upper portion of FIG. 3, and the messages 16-19 are sent. The second set-up request ends successfully when the MS receives the assignment command 19.

For the non-core network pooled case shown to the right in FIG. 1 the inventive check described above is not done since the BSC is always connected to one MSC node only.

In FIG. 6 the signaling sequences described in connection with FIGS. 4 and 5 are consolidated and shown in a diagram illustrating the nodes involved in the signaling along the horizontal direction and time along the vertical direction. Following the requirement that like reference designations should be used for like items in the drawings the reference designations used for the signaling arrows in FIG. 6 are not in successive order. The events symbolized by the arrows in the signaling diagrams of FIGS. 2, 3 and 6 appear in time order from the upper portion to the bottom portion of the respective Figures.

Figure 7:
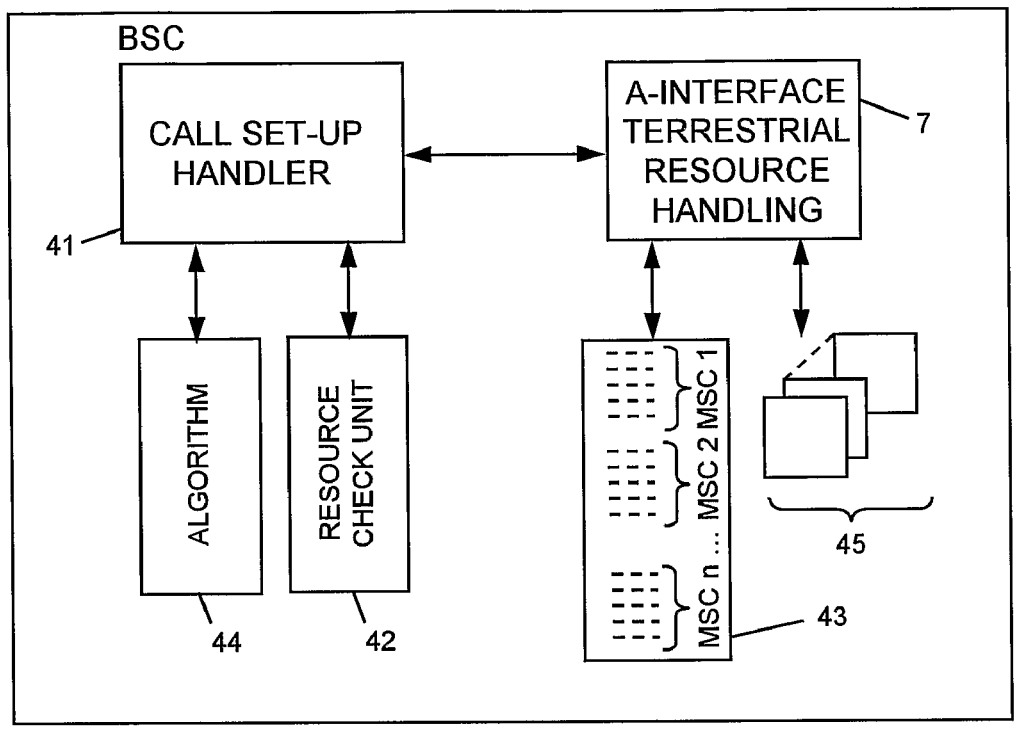
FIG. 7 is a block diagram of a BSC in accordance with the invention.

In FIG. 7 a block diagram of the entities that feature the BSC in accordance with the present invention are shown. The call set-up handler 41 co-operates with a logical entity referred to as a check function means 42 for checking the terrestrial transmission resources to each of the MSC nodes in the pool. These are symbolically shown in tables 43. The call set-up handler also co-operates with the above mentioned routing algorithm 44 for MSC allocation. Resource handler 7 co-operates with a plurality of logical transmission devices 45 representing the terrestrial transmission resources 5. Each logical transmission device is related to a time slot on a transmission link. The time slot is identified by the CIC value.

Figure 8:
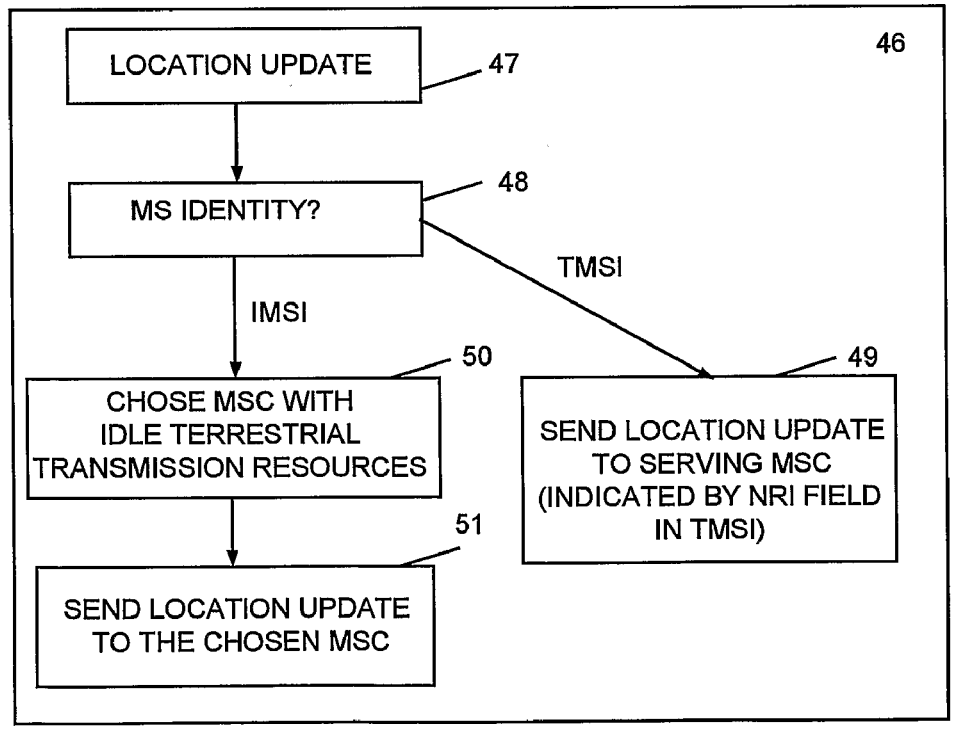
FIG. 8 is a flow diagram of a location update algorithm.

In FIG. 8 a location up-date algorithm 46 in BSC is so designed that upon reception of the location update message with IMSI, box 47, the MS identity contained in the message is checked, box 48. If a TMSI value is retrieved, indicating that the MS already is registered at a serving MSC, the location update message is sent to the serving MSC, box 49, as indicated by the NRI value contained in the TMSI parameter. If no TMSI-value is contained in the location update message and an IMSI value is present the BSC checks with its resource handler to find an MSC with enough idle terrestrial resources available and selects one, box 50. Next, the BSC sends the location update message to the selected MSC, box 51. Although not shown the selected MSC will return a TMSI value to the MS and register the MS in its associated VLR. The selected MSC is then the MSC that serves the MS. This MSC does hopefully not lack terrestrial resources and a subsequent call set-up from the MS can succeed. The location update algorithm 46 is not shown in FIG. 6, but it starts at circle 52 at the point of arrow 29 and ends at the foot of arrow 30 in the BSC node.

As mentioned previously the location update algorithm may be so designed that reception of a location update with IMSI at the BSC will cause the algorithm to select any of the MSC nodes in the pool. The selected MSC node will then allocate the MS a TMSI value and signal the allocated TMSI value to the MS. This would complete a non-successful service request. The next time the MS makes a call setup attempt, the call setup algorithm in the BSC node performs the check with the resource handler to find out if the serving MSC has enough idle terrestrial resources available free for the call.

The location update routing algorithm may comprise a list containing MSC nodes with idle terrestrial transmission resources available. In this case the information on the free resources need to be stored at two places, in the resource handler and in the location update algorithm. Alternatively the location update routing algorithm interacts with the resource handler to retrieve the information on the idle resources, this information being stored by the resource handler. Location update messages with IMSI are thus routed to MSC nodes with enough idle terrestrial resources.

Figure 9:
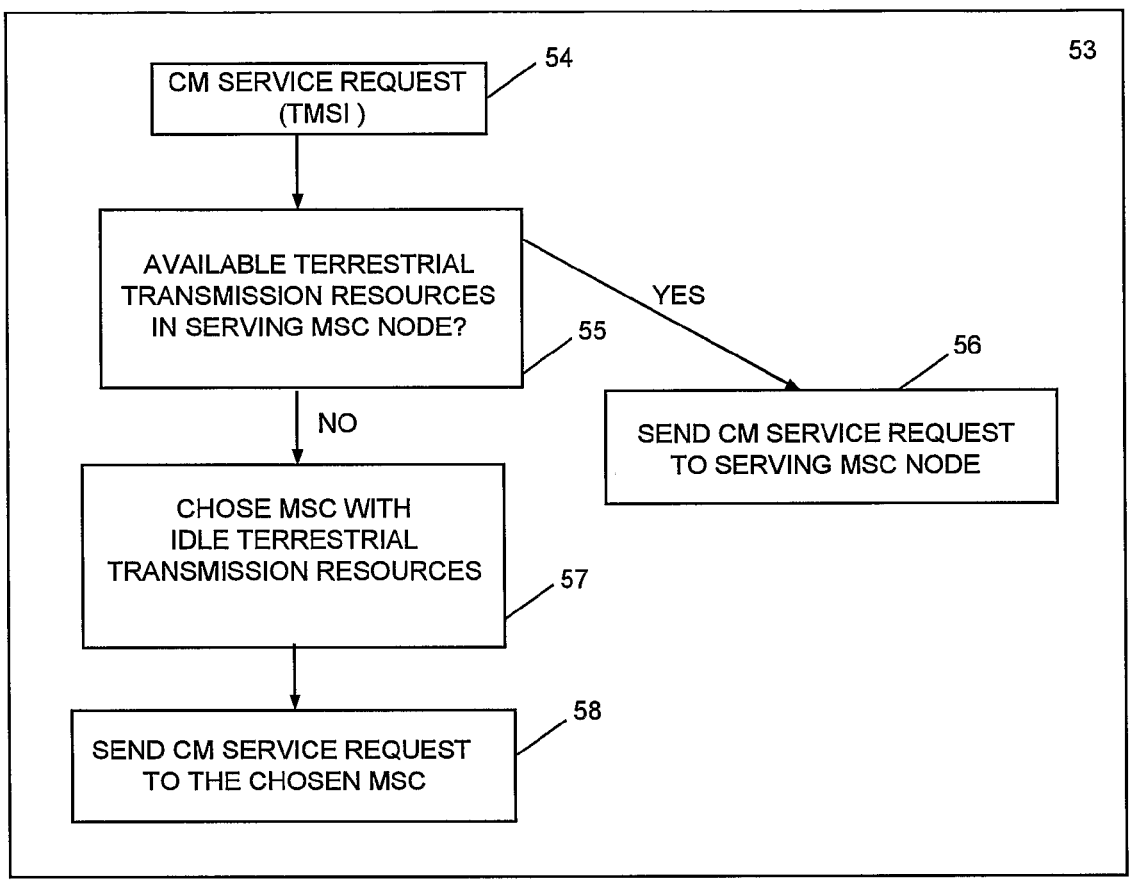
FIG. 9 is a flow diagram of a call set-up routing algorithm.

A call setup routing algorithm 53 for routing of service requests containing a TMSI value is shown in FIG. 9 and executes in the BSC. The service request containing a TMSI is received, box 54, by the BSC. The BSC checks with its resource handler to find out if there are any idle terrestrial transmission resources free to the serving MSC node, box 55. If there are, the algorithm sends the service request is forwarded to it, box 56. If no such resources are available, said check at the resource handler will give as result the MSC nodes in the pool to which there are enough idle resources available and the algorithm selects one of these, box 57. The service request is forwarded to the selected MSC node, box 58.

Although the invention has been described with reference to a GSM system it should be understood the invention may be equally well used in a WCDMA system.

Table I below lists the abbreviations and references used in the specification.

TABLE 1

LIST OF ABBREVATIONS

| | |
|---|---|
| 3GPP | Third Generation Partnership Project |
| BSC | Base Station Controller |
| CN | Core Network |
| CIC | Circuit Identity Code |
| GPRS | General Packet Radio System |
| GSM | Global System for Mobile Communications previously: Group Special Mobile |
| IMSI | International Mobile Subscriber Identity |
| LA | Location Area |
| MS | Mobile Station |
| MSC | Mobile Switching Centre |
| NRI | Network Resource Identifier |
| PROM | Programmable Read Only Memory |
| RAN | Radio Access Network |
| RNC | Radio Network Controller |
| SGSN | Serving GPRS Node |
| TMSI | Temporary Mobile Subscriber Identity |
| UE | User Terminal |
| UMTS | Universal Mobile Telecommunications System |
| VLR | Visitor Location Register |

REFERENCES

[1] 3GPP Technical Specification TS 23.236 V5 (2003-03)
[2] 3GPP Technical Specification TS 24.008 V6 (2004-06)

The invention claimed is:

1. A method of rerouting calls between a plurality of core network nodes in a telecommunication system provided with radio access nodes, the plurality of core network nodes being configured to serve a pool area within which a mobile station may roam without a need to change a serving core network node, the pool area being served by the plurality of core network nodes in parallel, the method comprising:
   the mobile station, at an initiative of its user, transmitting a call set-up request;
   a radio access node capturing the call set-up request
   the serving core network node checking terrestrial transmission resources from it to the radio access node to determine if there are any free terrestrial resources which can be seized for the requested call;
   the radio access node, before forwarding the call set-up request, checking if there exist any free terrestrial resources from it to a current serving core network node;
   the radio access node, in case there are free terrestrial resources from it to the serving core network node, forwarding the call set-up request to the current serving core network node;
   the radio access node, in case there are no free terrestrial resources from it to the current serving core network node, selecting another core network node of the pool area and rerouting the call set-up request to the another core network node; and
   the radio access node, after rerouting the call set-up request to the another core network node, selecting a new serving core network node of the pool area in response to a location update message from the mobile station,
   wherein there are free terrestrial resources from the radio access node to the current serving core network node,
   wherein there are free terrestrial resources from the radio access node to the new serving core network node, and
   wherein the location update message comprises a permanent identity of the mobile station.

2. The method of rerouting calls in accordance with claim 1, further comprising:
   the another core network node analyzing the rerouted call set-up request and upon finding that the rerouted call set-up request does not include a temporary mobile identity (TMSI) value associated with the another core network node, transmitting an identity request message to the mobile station;
   the mobile station in response to the identity request message sending its international mobile subscriber identity (IMSI) value to the another core network node;
   the another core network node not recognizing the received IMSI value and rejecting the call set-up request;
   the mobile station in response to the rejection of the call set-up request transmitting the location update message to the new serving core network node, the location update message comprising the IMSI value as the permanent identity of the mobile station, the new serving core network node being one of core network nodes in the pool area; and
   the new serving core network node registering the mobile station, allotting the mobile station a TMSI value and now acting as the core network node currently serving the mobile station.

3. The method of rerouting calls in accordance with claim 2, further comprising:
   the radio access node in response to the location update message comprising the IMSI value of the mobile station, and before transmitting the location update message to the new serving core network nodes, checking if there are other core network nodes in the pool area that have idle terrestrial transmission resources available and if so, selecting one such core network node as the new serving core network node and rerouting the location update message to the selected new serving core network node.

4. The method in accordance with claim 1,
   wherein in the step of selecting the another core network node, the another core network node is selected from any of the plurality of core network nodes other than the current serving network node, and
   wherein in the step of selecting the new serving core network node, the serving core network node is selected from any of the plurality of core network nodes.

5. The method in accordance with claim 1, wherein the call set-up request message is not forwarded to the current serving core network node when it is determined that there are insufficient idle terrestrial communication resources for the current serving core network node.

6. The method of rerouting calls in accordance with claim 2, wherein the telecommunication system is a GSM or a WCDMA system.

7. A radio access network node providing access to a plurality of core network nodes of a core network of telecommunications system, the plurality of the core network nodes being configured to serve a pool area within which a mobile station (MS) may roam without a need to change a serving core network node, the pool area being served by one or more core network nodes in parallel, the radio access network node comprising:
    resource check means for finding out idle terrestrial transmission resources to each one of the core network nodes in the pool area,
    wherein the resource check means comprises a call setup routing algorithm adapted to select another core network node in response to a receipt of a call setup request containing a temporary mobile station identity (TMSI) number when there are no idle terrestrial resources available to a current serving core network node for the mobile station, and
    wherein the resource check means co-operates with a location update algorithm and with a resource handler to check an identity of the mobile station which initiates a location update procedure, to identify core network nodes which have idle terrestrial transmission resources available, to select a core network node having such idle resources available as a new serving core network node, and to forward the location update message to the new serving core network node.

8. The radio access network node in accordance with claim 7, further comprising:
    a terrestrial transmission resource handler adapted to keep a running count of the terrestrial transmission resources available between the radio access network node and the new serving core network node,
    wherein the terrestrial transmission resource hander is adapted to co-operate with the location update algorithm and the call setup routing algorithm in order to select the new serving core network node.

9. The radio access network node in accordance with claim 8, wherein the location update algorithm and the call setup routing algorithm provide a list containing the core network nodes to which there are idle terrestrial transmission resources available.

10. The radio access network node in accordance with claim 7, wherein the telecommunication system is a GSM or a WCDMA system.

11. The radio access network node in accordance with claim 7, wherein the resource check means is configured to:
    select the another core network node from any of the plurality of core network nodes other than the current serving network node, and
    select the new serving core network node from any of the plurality of core network nodes.

12. The radio access network node in accordance with claim 7, wherein the resource check means is configured such that the call set-up request message is not forwarded to the current serving core network node when it is determined that there are insufficient idle terrestrial communication resources for the current serving core network node.

13. A method of operating a radio access node of a wireless telecommunication system, the radio access node being connected to each of a plurality of core network nodes of the wireless telecommunication system, the plurality of core network nodes serving a pool area, the method performed by the radio access node comprising:
    receiving a call set-up request message from a mobile station;
    identifying a current serving core network node of the mobile station based on a temporary identification of the mobile station included in the call set-up request message;
    determining whether there are sufficient idle terrestrial communication resources between the radio access node and the current serving core network node;
    when it is determined that there are sufficient idle terrestrial communication resources between the radio access node and the current serving core network node, forwarding the call set-up request message to the current serving core network node; and
    when it is determined that there are insufficient idle terrestrial communication resources between the radio access node and the current serving core network node, selecting another core network node serving the pool area other than the current serving core network node, the another core network node being such that there are sufficient idle terrestrial communications resources between the radio access node and the another core network node, and forwarding the call set-up request message to the another core network node;
    after forwarding the call set-up request message to the another core network node, receiving a location update message from the mobile station, the location update message including permanent identification of the mobile station; and
    selecting a new serving core network node from the plurality of core network nodes serving the pool in response to the location update message from the mobile station, the new serving core network node being such that there are sufficient idle terrestrial communication resources between the radio access node and the new serving core network node, and forwarding the location update message to the new serving core network.

14. The method according to claim 13, wherein when it is determined that there are insufficient idle terrestrial communication resources between the radio access node and the current serving core network node, the method performed by the radio access node further comprising:
    after forwarding the call set-up request message to the another core network node, receiving from the another core network node an identity request message and forwarding the identity request message to the mobile station;
    after forwarding the identity request message to the mobile station, receiving an identity response message from the mobile station, and forwarding the identity response message to the another core network node; and
    after forwarding the identity response message to the another core network node, receiving a call set-up request reject message from the another core network node and forwarding the set-up request reject message to the mobile station,
    wherein the step of receiving the location update message from the mobile station is performed after forwarding the set-up request reject message to the mobile station.

15. The method in accordance with claim 13,
    wherein in the step of selecting the another core network node, the another core network node is selected from any of the plurality of core network nodes other than the current serving network node, and
    wherein in the step of selecting the new serving core network node, the serving core network node is selected from any of the plurality of core network nodes.

16. The method in accordance with claim 13, wherein the call set-up request message is not forwarded to the current serving core network node when it is determined that there are insufficient idle terrestrial communication resources for the current serving core network node.

17. A radio access network node, comprising:
a call setup handler configured to reroute a call originating from a mobile station in a wireless telecommunication system comprising a plurality of core network nodes configured to serve a pool area within which the mobile station may roam without a need to change a serving core network node, the pool area being served by the plurality of core network nodes in parallel,
wherein the call setup handler is configured to:
receive a call set-up request message from the mobile station,
identify a current serving core network node serving the mobile station based on a temporary identification of the mobile station included in the call set-up request message, the current serving core network node being one of the plurality of core network nodes,
determine whether there are sufficient idle terrestrial communication resources for the current serving core network node,
forward the call set-up request message to the current serving core network node when it is determined that there are sufficient idle terrestrial communication resources for the current serving core network node,
select another core network node serving the pool area other than the current serving core network node when it is determined that there are insufficient idle terrestrial communication resources for the current serving core network node, wherein there are sufficient idle terrestrial communication resources for the another core network node,
forward the call set-up request message to the another core network node after the another core network node is selected,
receive a location update message from the mobile station after the call set-up request message is forwarded to the another core network node, the location update message including permanent identification of the mobile station,
select a new serving core network node from the plurality of core network nodes in response to the location update message from the mobile station, wherein there are sufficient idle terrestrial communication resources for the new serving core network node, and
forward the location update message to the new serving core network node after the new serving core network node is selected.

18. The radio access network node in accordance with claim 17, further comprising:
a terrestrial resource handler configured to maintain, for each of the plurality of core network nodes, information regarding idle terrestrial communication resources for that core network node,
wherein the call setup handler is configured to determine whether there are sufficient idle terrestrial communication resources for the current serving core network node by querying the terrestrial resource handler through a resource check message, and
wherein the terrestrial resource handler is configured to answer the query through a resource check response message that includes a number of idle terrestrial communication resources for the current serving core network node.

19. The radio access network node in accordance with claim 17, wherein the call setup handler is configured to:
receive from the another core network node an identity request message and forward the identity request message to the mobile station after the call set-up request message is forwarded to the another core network node,
receive an identity response message from the mobile station and forward the identity response message to the another core network node after the identity request message is forwarded to the mobile station, and
receive a call set-up request reject message from the another core network node and forward the set-up request reject message to the mobile station after the identity response message is forwarded to the another core network node,
wherein the call setup handler is configured to receive the location update message from the mobile station after the call set-up request reject message is forwarded to the mobile station.

20. The radio access network node in accordance with claim 17, wherein the call setup handler is configured to:
select the another core network node from any of the plurality of core network nodes other than the current serving network node, and
select the new serving core network node from any of the plurality of core network nodes.

21. The radio access network node in accordance with claim 17, wherein the call setup handler is configured such that the call set-up request message is not forwarded to the current serving core network node when it is determined that there are insufficient idle terrestrial communication resources for the current serving core network node.

* * * * *

UNITED STATES PATENT AND TRADEMARK OFFICE
CERTIFICATE OF CORRECTION

PATENT NO.         : 8,315,634 B2
APPLICATION NO.    : 11/662894
DATED              : November 20, 2012
INVENTOR(S)        : Gustavsson Page 1 of 1

It is certified that error appears in the above-identified patent and that said Letters Patent is hereby corrected as shown below:

In Fig. 1, Sheet 1 of 6, delete "Fig" and
insert -- Fig. --, therefor at each occurrence throughout the Drawings.

In Column 3, Line 55, delete "available." and insert -- available, --, therefor.

In Column 8, Line 29, delete "receiption" and insert -- reception --, therefor.

In Column 9, Line 17, delete "Table I" and insert -- Table 1 --, therefor.

In Column 9, Line 45, delete "(2004-06)" and insert -- (2004-06). --, therefor.

In Column 9, Line 56, in Claim 1, delete "request" and insert -- request; --, therefor.

In Column 10, Lines 20-21, in Claim 2, delete "mobile identity" and
insert -- mobile station identity --, therefor.

In Column 11, Line 35, in Claim 8, delete "hander" and insert -- handler --, therefor.

Signed and Sealed this
Nineteenth Day of February, 2013

Teresa Stanek Rea
*Acting Director of the United States Patent and Trademark Office*